Figure 1:
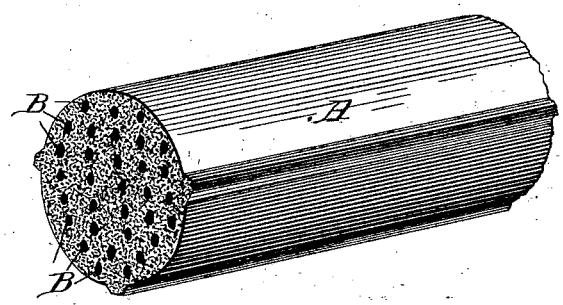

(Model.)

J. F. MARTIN.
COMPOUND FOR ELECTRIC WIRE INSULATORS.

No. 282,914. Patented Aug. 7, 1883.

Witnesses.
Will R. Onohundro.
W. W. Elliott

Inventor
John F. Martin
By Jno. G. Elliott
Atty.

UNITED STATES PATENT OFFICE.

JOHN F. MARTIN, OF CHICAGO, ILLINOIS.

COMPOUND FOR ELECTRIC-WIRE INSULATORS.

SPECIFICATION forming part of Letters Patent No. 282,914, dated August 7, 1883.

Application filed March 30, 1883. (Specimens.)

*To all whom it may concern:*

Be it known that I, JOHN F. MARTIN, a citizen of the United States, residing in Chicago, county of Cook, and State of Illinois, have invented certain new and useful Improvements in Compounds for Electric-Wire Insulators, Pipes, and other Articles, of which the following is a specification.

This invention relates to a novel compound or composition of matter which I have found to be of special and marked utility in the manufacture of pipes, tubes, and other insulators for electric conductors, but which can be also used for various other articles of manufacture.

My invention consists, essentially, in a compound consisting of a base composed of asphaltum and marble-dust, to which, if preferred, other materials—such, for example, as shellac—can be added, or which can be used without the addition of such material or materials with highly advantageous results.

In preparing this base, I take the two articles known to the trade as "asphaltum" and "marble-dust," the former being commonly used in paving compounds and the latter in the manufacture of carbonic-acid gas for mineral waters. The asphaltum is liquidized by heat, and while hot from forty to sixty per cent. of the fine marble-dust is poured into the asphaltum and stirred in with the same. This hot liquid compound is then run into molds of any desired form. It will be found that the compound will rapidly set in cooling, and this action is so rapid that it should not be allowed to cool until poured into the molds.

The molded article will present substantially the characteristics of a homogeneous substance, and will be hard, strong, and susceptible of a high polish. Its insulating qualities render it useful in the highest degree for pipes or tubes for electric wires. Pipes thus made are admirably suited for underground lines, since they are strong and durable, are not liable to corrode, and are impervious to moisture. Tubular insulators for houses made of this compound are also very desirable for the interior of houses, since, in addition to their insulating and durable qualities, they can also be highly polished.

In some cases I can, if preferred, add a small quantity of shellac to the compound, this latter substance being also a good insulator, and serving to render the article, if anything, more tough. I do not confine myself, however, to pipes and tubes, since insulating knobs, boxes, and the tubes could be made from my compound, and, in fact, a great variety of articles produced therefrom.

In the annexed drawings I have shown several forms of insulators for electric wires which can be conveniently made from my compound.

Figure 2:
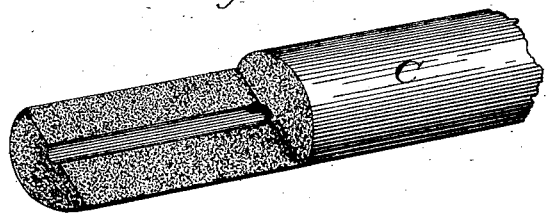
Figure 3:
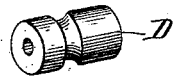
Figure 4:
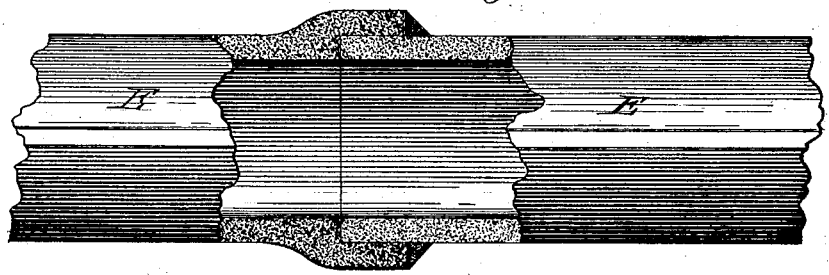

Figure 1 represents in perspective a solid cylinder formed with a series of parallel longitudinal bores which are in line coincident with the axis of the cylinder. Fig. 2 is a perspective view of a section of a tube, with a portion thereof broken away. Fig. 3 represents an insulating-knob for electric wires. Fig. 4 shows in section two pipes coupled together.

A indicates a cylindrical body formed with longitudinal bores B. This cylinder is especially adapted to be placed within a conduit for underground wires, which are carried through the bores of the said cylinder. This cylinder or insulating-support can be easily molded, and will constitute an efficient insulator for the wires. The tube C is also molded from my compound in any desired length, and tubes thus made can be formed with couplings or be coupled together by separately-made couplings. In the remaining figures, D indicates an insulating knob or post, and E pipe formed, provided with couplings, all made from the compound hereinbefore described. These devices serve to illustrate some of the important uses which can be made of my compound, it being understood, however, that numerous other articles can be made from the same.

Articles made of the composition herein described are exceedingly tough, hard, and, in fact, the composition has some of the characteristics of metal without the objectionable feature of liability to oxidation. Hence moldings and tile for houses, or blocks for paving, fence-posts, and a great variety of articles can be made of the composition.

Having thus described my invention, what I claim, and desire to secure by Letters Patent, is—

A compound for the purposes herein described, consisting of a base composed of asphaltum and marble-dust, substantially as set forth.

JOHN F. MARTIN.

Witnesses:
W. W. ELLIOTT,
CHAS. G. PAGE.